(12) United States Patent
Chittenden

(10) Patent No.: US 7,007,659 B2
(45) Date of Patent: Mar. 7, 2006

(54) MECHANISM FOR REMOVABLY COUPLING A SHAFT OF A UTILITARIAN DEVICE TO AN INTERNAL COMBUSTION ENGINE

(75) Inventor: Jonathan R. Chittenden, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 24 days.

(21) Appl. No.: 10/774,237

(22) Filed: Feb. 6, 2004

(65) Prior Publication Data

US 2005/0172928 A1    Aug. 11, 2005

(51) Int. Cl.
*F02B 77/00*    (2006.01)

(52) U.S. Cl. .................................. 123/198 R; 417/234
(58) Field of Classification Search ............ 123/198 R, 123/198 C, 195 C, 196 W; 417/234
See application file for complete search history.

(56) References Cited

U.S. PATENT DOCUMENTS

| | | |
|---|---|---|
| 3,204,619 A | 9/1965 | Rubinowitz et al. |
| 3,608,290 A | 9/1971 | Robinson |
| 3,668,845 A | 6/1972 | Parker |
| 3,690,384 A | 9/1972 | Patterson |
| 3,721,077 A | 3/1973 | van der Lely |
| 3,812,917 A | 5/1974 | Strate |
| 3,945,176 A | 3/1976 | Vicendese et al. |
| 3,979,827 A | 9/1976 | Anzur |
| 3,984,893 A | 10/1976 | Ashley |
| 4,095,922 A | 6/1978 | Farr |
| 4,304,141 A | 12/1981 | Tone et al. |
| 4,354,341 A | 10/1982 | Hathaway |
| 4,366,877 A | 1/1983 | Vissers et al. |
| 4,446,679 A | 5/1984 | Thomas |
| 4,478,028 A | 10/1984 | Dawson, Jr. |
| 4,528,805 A | 7/1985 | Zitta |
| 4,580,534 A | 4/1986 | Blum et al. |
| 4,597,203 A | 7/1986 | Middleton |
| 4,718,221 A | 1/1988 | Wessel et al. |
| 4,882,940 A | 11/1989 | Yamaoka et al. |
| 4,942,725 A | 7/1990 | Ruder, Sr. |
| 4,965,990 A | 10/1990 | Slawson, Sr. et al. |
| 5,000,269 A | 3/1991 | Aoki et al. |
| 5,090,088 A | 2/1992 | Toth |
| 5,090,142 A | 2/1992 | Peters |
| 5,187,926 A | 2/1993 | Rhoads |
| 5,372,106 A | 12/1994 | Botterrill |
| 5,449,140 A | 9/1995 | Lastowski |
| 5,497,606 A | 3/1996 | Baxter |
| 5,704,331 A | 1/1998 | Eberbach et al. |
| 5,873,224 A | 2/1999 | Murakawa et al. |
| 5,983,613 A | 11/1999 | Winter |
| 6,094,896 A | 8/2000 | Lane |

(Continued)

*Primary Examiner*—Mahmoud Gimie
(74) *Attorney, Agent, or Firm*—George E. Haas; Quarles & Brady LLP

(57) ABSTRACT

A powered apparatus constitutes a utilitarian device removably mounted on an internal combustion engine. That engine has a housing, a vertical crankshaft, and an engine coupling connected to the upper end of the crankshaft. The utilitarian device includes a body and a drive connector that is removably coupled to the crankshaft to receive rotational force from the internal combustion engine. The weight of the utilitarian device is carried by a support bearing which is fixedly connected to either the body or the engine coupling and releasably engages the other of the body and the engine coupling.

19 Claims, 3 Drawing Sheets

U.S. PATENT DOCUMENTS

| | | |
|---|---|---|
| 6,131,380 A | 10/2000 | Browning |
| 6,145,479 A * | 11/2000 | Rotter .................... 123/41.49 |
| 6,155,035 A | 12/2000 | Merritt, III |
| 6,192,853 B1 | 2/2001 | Narsume |
| 6,244,239 B1 | 6/2001 | Sisco et al. |
| 6,250,273 B1 | 6/2001 | Ryu et al. |
| 6,644,264 B1 * | 11/2003 | Shoemaker ............. 123/198 R |
| 2003/0235505 A1 * | 12/2003 | Brunelli ..................... 417/234 |

* cited by examiner

MECHANISM FOR REMOVABLY COUPLING A SHAFT OF A UTILITARIAN DEVICE TO AN INTERNAL COMBUSTION ENGINE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to internal combustion engines, and to mechanisms for coupling removable utilitarian devices to be driven by an engine.

2. Description of the Related Art

Many types of power equipment, such as walk-behind and riding lawnmowers, utilize an internal combustion engine which has a vertically oriented crankshaft. The crankshaft rotates about a vertical axis when driven by one or more pistons which move within horizontal bores in the engine block. The crankshaft projects from the bottom of the engine where the implement being driven is attached. For a walk-behind lawnmower, a blade is attached to the lower end of the engine crankshaft and, for a riding lawnmower, a pulley or sprocket often is connected to that end of the crankshaft to drive the blades and wheels. The upper end of the vertical crankshaft typically connects to a flywheel and starter mechanism and does not extend out of the engine housing.

In some power equipment, it is desirable that the engine also power utilitarian devices, in addition to the primary implements, such as the blade and wheels of a lawnmower. Heretofore, the common technique employed by these and other types of power equipment was to drive such utilitarian devices from a coupling attached to the bottom end of the engine's crankshaft. For example, U.S. Pat. No. 6,155,035 describes a power take-off which couples the engine of a walk-behind lawnmower to a chipper-shredder placed alongside. U.S. Pat. No. 4,965,990 discloses attachment of an edger assembly to a walk-behind lawnmower. Thus all the equipment driven by the engine receive power from that same end of the crankshaft.

After an engine has been assembled unto a piece of power equipment, such as a lawnmower, it may be extremely difficult for a user to attach utilitarian devices that require power from the engine. Manufacturers often mount the engine on the frame of the equipment in such a manner where access to the lower end of the crankshaft is difficult or impossible. Unless the power equipment manufacturer provides a power take-off coupling, additional accessories often cannot be connected to the engine. Even when a power take-ff coupling is provided, it often requires exposed belts, chains or shafts which present a safety hazard.

In addition to lawnmowers, there are a variety of other equipment, such as electrical generators, power washers, vacuums, air compressors and chipper-shredders, that are driven by gasoline powered internal combustion engines. Heretofore each different piece of equipment had it own dedicated engine which added to the expense of the equipment. Cost savings could be achieved by designing a cart with a generic portable internal combustion engine to which different types of equipment can be interchangeably connected. For example, this enables a user to attach an electrical generator to the engine when power is needed at a remote location and at other times attach a pump or air compressor to the engine when those devices are needed.

Therefore, it is desirable to provide mechanism for interchangeably mounting a variety of utilitarian devices to an internal combustion engine in a manner that enables the devices to be exchanged easily by a user.

SUMMARY OF THE INVENTION

A powered apparatus includes an internal combustion engine with a housing and a vertical crankshaft. A utilitarian device has a body and a drive connector removably coupled to the crankshaft for receiving rotational force from the internal combustion engine. A support bearing is fixedly connected to either the body or the vertical crankshaft, and releasably engages the other of the body and the vertical crankshaft. The weight of the utilitarian device is transferred through the support bearing to the internal combustion engine.

Preferably the powered apparatus has an engine coupling attached to the crankshaft and engaging the support bearing. The engine coupling has an aperture into which the drive connector is received. Although different types of drive interfaces can be employed between engine coupling and drive connector, one preferred interface uses a splined shaft as the drive connector and the aperture of the engine coupling has grooves within which the splines are received. In one embodiment, the engine coupling is attached to a flywheel that is mounted on the crankshaft.

The utilitarian device has an apparatus connected to the drive member, wherein the apparatus may be an air blower, an air compressor, a chipper-shredder, a pump, a power washer, a vacuum, a chemical sprayer, and an electrical generator.

DETAILED DESCRIPTION OF THE INVENTION

Figure 1:
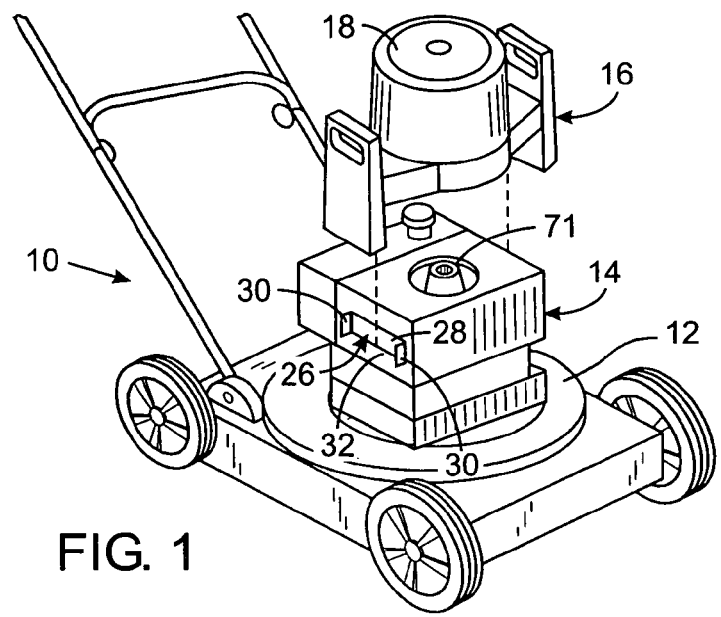
FIG. 1 is an isometric view of a walk-behind lawnmower which incorporates an internal combustion engine to which several different devices can be attached.

With initial reference to FIG. 1, a conventional walk-behind lawnmower 10 has a deck 12 on which an internal combustion engine 14 is mounted by conventional means. The engine 14 is of a vertical crankshaft design wherein the bottom end of the crankshaft extends below the deck 12 of the lawnmower and is attached to the mowing blade (not visible). A pulley or other mechanism also may be attached to the lower end of the crankshaft to drive the wheels of the lawnmower in a conventional manner. Although the invention is being described in the context of a walk-behind lawnmower 10, the engine 14 could be mounted on a riding lawnmower or a wide variety of other types of power equipment. In addition, the engine 14 could be mounted on a wheeled cart, similar to the lawnmower deck 12, but where the lower end of the crankshaft is not connected to an implement.

The lawnmower 10 also has a utilitarian device 16 which can be removably mounted on top of the engine 14 to receive mechanical power from the upper end of the crankshaft. The utilitarian device typically would be removed from engagement with the engine when the lawnmower is used to cut grass and as such the term "utilitarian device" as used herein means a useful device which is not necessary for the engine to operate. Thus the utilitarian device is not necessary for operation of the tractor, lawnmower or the engine. Furthermore, the terms "removable" and "removably" as used herein mean the ability to disconnect the utilitarian device from the engine without having to disassemble the power equipment or use tools. In the exemplary embodiment in FIG. 1, the utilitarian device 16 is an electrical generator 18 which produces 120 volt, 60 Hz alternating current at a duplex outlet. The electrical generator 18 is an example of but one type of a utilitarian device which benefits from the novel concepts of the present invention. Any number of utilitarian devices 16, such as an air blower, air compressor, arc welder, general purpose pump, chipper-shredder, power washer, vacuum, chemical sprayer, and similar items of powered equipment for example, can be removably mounted in this manner. It should be understood that a given user may possess several different types of utilitarian devices 16 which are interchanged on a single internal combustion engine 14 as needed.

Figure 2:
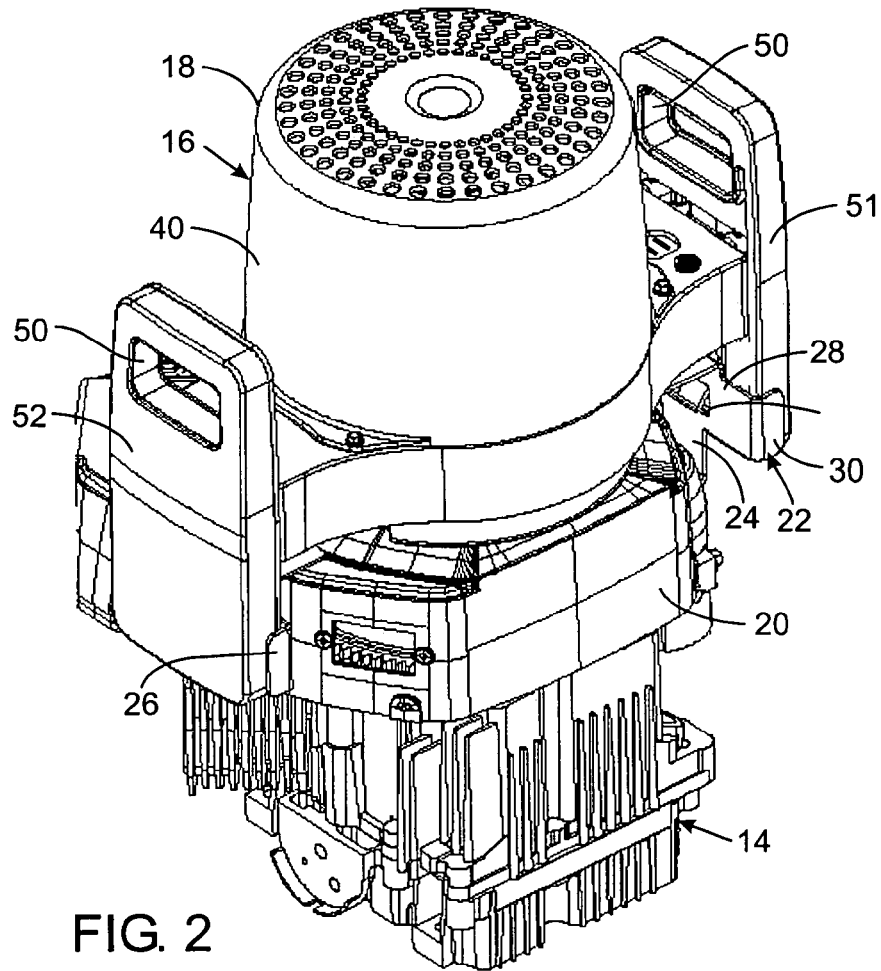
FIG. 2 is an isometric view of the internal combustion engine in FIG. 1 with an electrical generator attached thereto.
Figure 3:
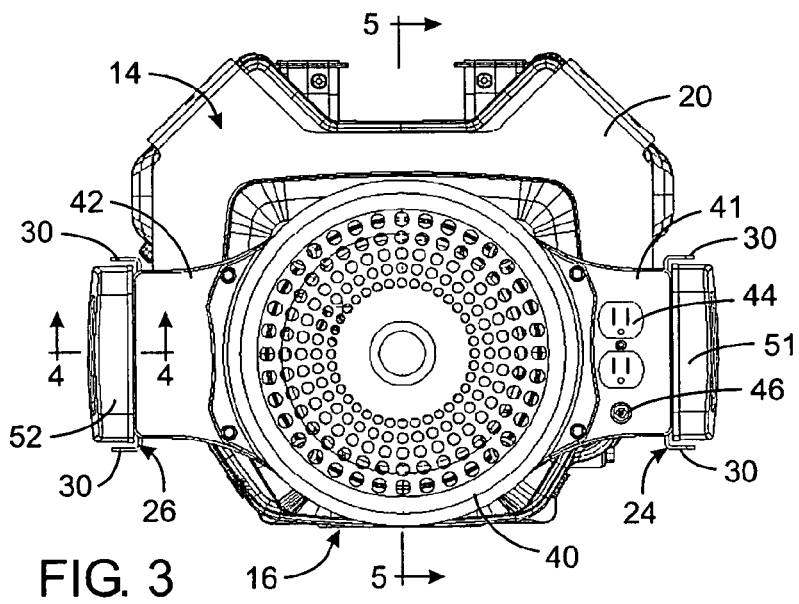
FIG. 3 is a top view of the electrical generator mounted on the engine.

Referring to FIGS. 2 and 3, the internal combustion engine 14 is of a conventional design with one or more cylinders that drive a crankshaft mounted vertically in the crankcase. The internal combustion engine 14 has a housing 20 which may simply be the crankcase or may be an exterior enclosure around the crankcase. A bracket unit 22 is attached to the engine crankcase and includes has a first bracket 24 located on one side of the housing and a second bracket 26 located on the opposite side. Each bracket 24 and 26 has a vertical plate 28 from which a pair of spaced apart tabs 30 project outwardly forming a notch 32 there between (see also FIG. 1).

The utilitarian device 16 has a body 40 enclosing the working components that are driven by the internal combustion engine 14. In the case of electrical generator 18, the body 40 has a cylindrical shape, however other utilitarian devices can have bodies with other geometric shapes. First and second wings 41 and 42 project horizontally from the lower section of the body 40 which is adjacent the internal combustion engine 14. The upper surface of the first wing 41 has a standard duplex electrical outlet 44 and a reset button 46 for a circuit breaker. Electrical equipment, such as power tools, can be powered by the generator via connection to the duplex electrical outlet 44.

A first handle 51 is connected to the end of the first wing 41 that is remote from the body 40 and a second handle 52 is connected to the remote end of the second wing 42. Each handle 51 and 52 has a rectangular aperture 50 through which the user places a hand to grasp and carry the utilitarian device 16. Grasping the handle releases a latching mechanism 55 that secures the utilitarian device 16 to the internal combustion engine 14.

Figure 4:
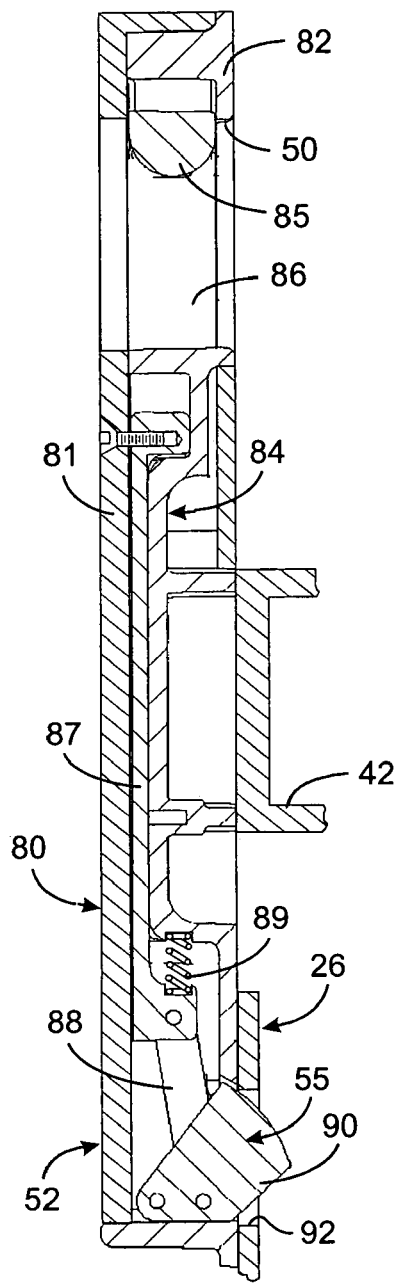
FIG. 4 is a cross-sectional view along line 4—4 in FIG. 3 illustrating a mechanisms in the handles which latch the electrical generator to the engine.

FIG. 4 illustrates that latching mechanism 55 in one handle 52 with the other handle 51 having an identical mechanism. The handle 52 has a shell 80 formed by two halves 81 and 82 with a cavity there between. A latch slider 84 is received in that cavity and has a grip 85 at the top of the rectangular aperture 50 in the handle. The grip 85 is connected by side bars 86 extending along the vertical sides of the rectangular aperture 50 to the upper end of a pull bar 87. The lower end of the pull bar 87 is pivotally connected by a first pin to one end of a link 88 having another end pivotally connected by a second pin to a latch dog 90. A compression spring 89 biases the pull bar 87 downward which rotates the latch dog 90 outward from the handle shell 80 illustrated. When the utilitarian device 16 is fully seated on the internal combustion engine 14, the latch dog 90 projects into an aperture 92 in the bracket 26 attached to the internal combustion engine 14 thereby preventing the device from moving upward away from the engine.

Figure 5:
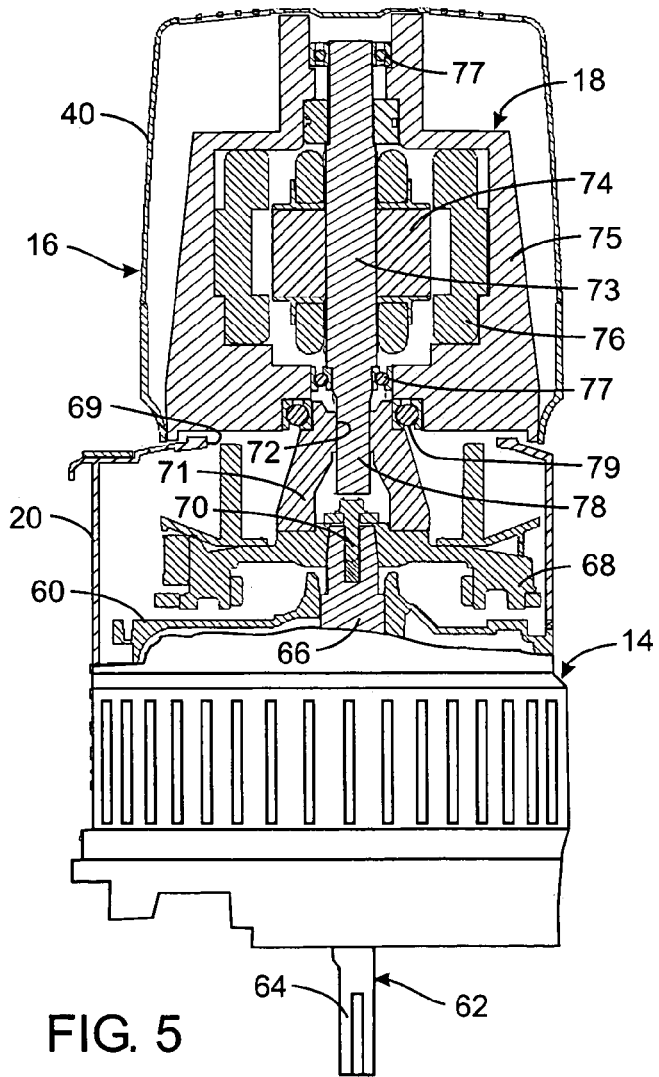
FIG. 5 is a partial cross-sectional view along line 5—5 in FIG. 3.

FIG. 5 illustrates how the utilitarian device 16 is removably coupled to receive mechanical power from the internal combustion engine 14. The engine 14 includes a conventional crankcase 60 with a cylinder and a piston (not visible) that drives the vertical crankshaft 62. When the engine 14 is mounted on the deck 12 of the lawnmower 10, the mowing blade attaches to a lower end 64 of the crankshaft 62. The upper end 66 of the crankshaft 62 extends above the crankcase 60 and is connected to a flywheel 68 by a bolt 70 or similar fastener. An engine coupling 71 is secured to the flywheel 68 and has a longitudinally grooved aperture 72 which is coaxial with the axis of the crankshaft 62. The upper surface of the engine housing 20 has an opening 69 through which the engine coupling 71 extends. Alternatively the engine coupling 71 could be recessed beneath the top of the engine housing 20. When a utilitarian device 16 is not connected to the internal combustion engine 14, a cap (not shown) closes this housing opening 69 and extends over the engine coupling 71.

The utilitarian device 16 has a drive shaft 73 which when rotated propels the mechanical components inside device. In the case of the electrical generator 18, an electromagnet winding 74 is attached to the drive shaft 73 to form an armature that rotates within a stator coil 76. The drive shaft 73 is supported in an internal frame 75 of the body 40 by two ball bearings 77 and the frame also supports the stator coil 76. One end of the drive shaft 73 projects from the body 40 of the utilitarian device 16 and forms a drive connector 78 that is inserted into the grooved aperture 72 of the engine coupling 71. The drive connector 77 has splines which are received in the longitudinal grooves in the engine coupling aperture 72 so that rotational force is transferred from engine to the utilitarian device. Although a spline coupling is preferred to connect the drive shaft 73 of the utilitarian device 16 to the engine coupling 71, other types of couplings can be employed. For example, the end of the drive shaft 73 can have a square or other non-circular cross section that is received in a mating aperture in the engine coupling 71.

A support bearing 79, such as a ball bearing, has an outer race that is fixedly attached to the frame 75 of the utilitarian device and has an inner race extending around and spaced from the drive shaft 73. When the utilitarian device 16 is placed on the internal combustion engine 14, the inner race of the support bearing 79 removably rests on a shoulder of the engine coupling 71. Substantially the entire weight of the utilitarian device 16 is supported by the engine through the support bearing 79. Any contact between the body of the utilitarian device 16 and the engine 14 is incidental to the support provided by the support bearing 79 engaging the engine coupling 71. The support bearing 79 enables the rotating engine coupling 71 to support the stationary body of the utilitarian device 16.

To attach the utilitarian device 16 to the internal combustion engine 14, the user grasps the handles 51 and 52 with both hands and holds the device above the engine as shown in FIG. 1. With additional reference to FIG. 4, the utilitarian device 16 is lowered from this position until that the end of its drive shaft 73 enters the aperture 72 in the engine coupling 71. The user may have to rotate the utilitarian device 16 in order that the splines on the drive shaft 73 align with and enter the grooves in the engine coupling aperture as the device is lowered. The user then further rotates the utilitarian device 16 so that the handles 51 and 52 slide into the notches 32 between the tabs 30 on the engine brackets 24 and 26 as shown in FIG. 2. When the utilitarian device 16 is fully seated on the internal combustion engine 14, as shown in FIG. 4, and the handles are released by the user, the latching mechanisms 55 on the handles engage the brackets 24 and 26.

With the utilitarian device 16 mounted on the internal combustion engine 14, the tabs 30 on the engine brackets 24 and 26 restrict movement of the handles 51 and 52, essentially preventing rotation the utilitarian device body as the engine propels the drive shaft 73. The latches secure the utilitarian device 16 from moving upward away from the engine 14 due to engine vibration. The engine brackets 24 and 26 and the latching mechanisms 55 in the handles 51 and 52 form a device coupling which secures the utilitarian device body 40 to the engine housing 20.

To remove the utilitarian device 16, the user grasps the handles 51 and 52 through apertures 50 and releases the latches. With reference to FIG. 5, by grasping the handles, the user squeezes the latch slider grip 85 against the upper section of the handle shell 80 thereby raising the latch slider 84 upward. That motion it transferred by the link 88 to the latch dog 90 which rotates into a retracted position within the handle shell 80 and away from engagement with the bracket 26 on the internal combustion engine 14. This enables the utilitarian device to be lifted away from the engine 14 which extracts the drive shaft 73 from the engine coupling 71. Once the drive shaft 73 is clear of the engine 14, the utilitarian device 16 can be placed in a storage location. The lawnmower 10 then is available for cutting grass or to receive another utilitarian device.

Figure 6:
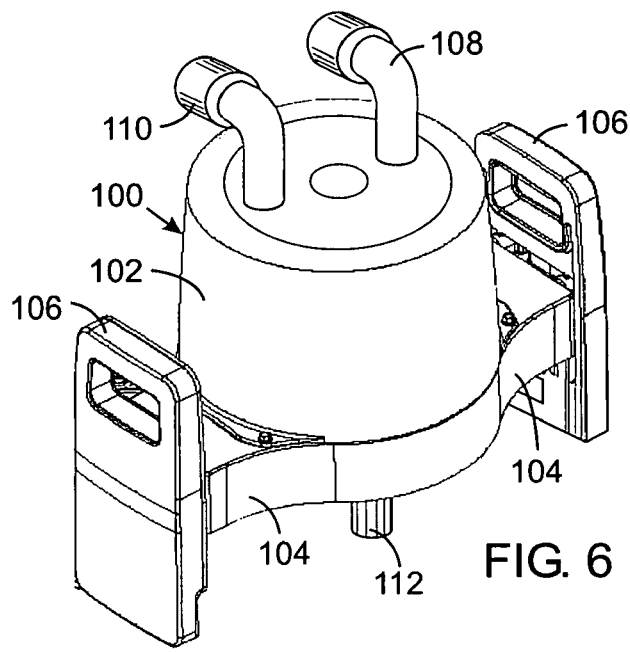
FIG. 6 is an isometric view of a pump that can be attached to and driven by the engine in place of the electrical generator.

FIG. 6 illustrates a pump 100 which can be attached to the internal combustion engine 14 in place of the electrical generator 16. The structure of outer casing of the pump 100 is similar to the electrical generator 16. Specifically, the pump 100 has a cylindrical body 102 enclosing the working components of the pump. A pair of wings 103 project outwardly from the body 102 and have separate handles 106 at the remote ends. The handles have latches which engage the engine brackets 24 and 26 to releasably secure the pump 100 to the engine 14, as described previously with respect to the handles of the generator 16. An inlet connector 108 and an outlet connector 110 for the fluid being pumped are provided on the upper surface of the body for connecting hoses to the pump. A drive shaft 112 extends downward from the body for engaging the engine coupling 71.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A powered apparatus comprising:
   an internal combustion engine with a housing and a vertical crankshaft;
   a utilitarian device having a body and a drive connector removably coupled to the crankshaft for receiving rotational force from the internal combustion engine; and
   a support bearing fixedly connected to one of the body and the vertical crankshaft, and releasably engaging the other of the body and the vertical crankshaft, wherein weight of the utilitarian device is transferred through the support bearing to the internal combustion engine.

2. The powered apparatus as recited in claim 1 wherein the utilitarian device comprises an apparatus connected to the drive connector, wherein the apparatus is selected from the group consisting of an air blower, an air compressor, a pump, a chipper-shredder, a power washer, a vacuum, a chemical sprayer, and an electrical generator.

3. The powered apparatus as recited in claim 1 wherein substantially all the weight of the utilitarian device is transferred through the support bearing to the internal combustion engine.

4. The powered apparatus as recited in claim 1 further comprising an engine coupling attached to the crankshaft and engaging the support bearing, the engine coupling having an aperture into which the drive connector is received.

5. The powered apparatus as recited in claim 1 further comprising flywheel attached to the crankshaft and having an engine coupling mounted thereon and removably engaged by the support bearing and by the drive connector.

6. The powered apparatus as recited in claim 1 wherein:
   the internal combustion engine further comprises an engine coupling attached to the crankshaft and having an aperture; and
   the drive connector of the utilitarian device comprises a shaft which is received in the aperture.

7. The powered apparatus as recited in claim 6 wherein the aperture of the engine coupling has a non-circular cross section; and the shaft of the drive connector has a cross section which mates with the non-circular cross section of the engine coupling.

8. The powered apparatus as recited in claim 6 wherein the shaft of the drive connector has splines; and the aperture of the engine coupling has grooves within which the splines are received.

9. A powered apparatus comprising:
   an internal combustion engine having a vertical crankshaft, and an engine coupling connected to the vertical crankshaft and having an aperture;
   a utilitarian device having a body and a drive shaft removably received in the aperture of the engine coupling; and
   a support bearing secured to one of the body and the engine coupling, and removably engaging the other of the body and the engine coupling, wherein weight of the utilitarian device is transferred through the support bearing to the internal combustion engine.

10. The powered apparatus as recited in claim 9 further comprising a flywheel connecting the engine coupling to the vertical crankshaft.

11. The powered apparatus as recited in claim 9 wherein substantially all the weight of the utilitarian device is transferred through the support bearing to the internal combustion engine.

12. The powered apparatus as recited in claim 9 wherein the support bearing is secured to the body of the utilitarian device and removably engages the engine coupling.

13. The powered apparatus as recited in claim 9 wherein the aperture of the engine coupling has a non-circular cross section; and the drive shaft has a cross section which mates with the non-circular cross section of that aperture.

14. The powered apparatus as recited in claim 13 wherein the drive shaft has splines; and the aperture of the engine coupling has grooves within which the splines are received.

15. A utilitarian device for connection to an internal combustion engine which has a housing, a crankshaft, and an engine coupling connected to the crankshaft, the utilitarian device comprising:
 a body;
 a drive member for removable connection to the engine coupling to receive rotational force from the internal combustion engine; and
 a support bearing secured to the body to removably engage the engine coupling, wherein weight of the utilitarian device is transferred through the support bearing to the internal combustion engine.

16. The utilitarian device as recited in claim 15 wherein the utilitarian device comprises an apparatus connected to the drive member, wherein the apparatus is selected from the group consisting of an air blower, an air compressor, a pump, a chipper-shredder, a power washer, a vacuum, a chemical sprayer, and an electrical generator.

17. The utilitarian device as recited in claim 15 wherein the drive member comprises a shaft which is received in an aperture in the engine coupling.

18. The utilitarian device as recited in claim 17 wherein the aperture of the engine coupling has a non-circular cross section; and the shaft of the drive member has a cross section which mates with the non-circular cross section of that aperture.

19. The utilitarian device as recited in claim 17 wherein the shaft of the drive member has splines; and the aperture of the engine coupling has grooves within which the splines are received.

* * * * *